US011475019B2

(12) United States Patent
Paul

(10) Patent No.: US 11,475,019 B2
(45) Date of Patent: Oct. 18, 2022

(54) CONTACT GRAPH SCORING SYSTEM

(71) Applicant: PayPal, Inc., San Jose, CA (US)

(72) Inventor: Nilotpal Paul, Bangalore (IN)

(73) Assignee: PAYPAL, INC., San Jose, CA (US)

(*) Notice: Subject to any disclaimer, the term of this patent is extended or adjusted under 35 U.S.C. 154(b) by 118 days.

(21) Appl. No.: 17/066,905

(22) Filed: Oct. 9, 2020

(65) Prior Publication Data

US 2022/0114183 A1  Apr. 14, 2022

(51) Int. Cl.
*G06F 17/00* (2019.01)
*G06F 16/2457* (2019.01)
*G06N 20/00* (2019.01)

(52) U.S. Cl.
CPC ....... *G06F 16/24575* (2019.01); *G06N 20/00* (2019.01)

(58) Field of Classification Search
CPC ............ G06F 16/24575; G06F 16/285; G06F 16/9024; G06F 16/282; G06F 16/9027; G06N 20/00
See application file for complete search history.

(56) References Cited

U.S. PATENT DOCUMENTS

| 10,313,526 B2* | 6/2019 | Steiner | G06Q 30/016 |
| 10,721,242 B1* | 7/2020 | Jones | H04L 63/126 |
| 2012/0191596 A1* | 7/2012 | Kremen | G06Q 40/02 |
| | | | 705/38 |

* cited by examiner

*Primary Examiner* — Greta L Robinson
(74) *Attorney, Agent, or Firm* — Haynes and Boone, LLP

(57) ABSTRACT

Machine learning techniques are disclosed that allow device contact list information to be leveraged in building better models that provide more accurate assessment of user transaction risks. A computing device may receive a contact list that includes a first set of user device identifiers and generates a contact graph for that user by associating the user device identifier with the first set as first-degree contacts. The computing device may then determine that a portion of the first set of the user device identifiers are stored in a contact database (e.g. on a server) and generate a user score based on user information associated with the first set, the contact graph, and a contact graph model. The computing device may provide the user score to a transaction assessment service as in input for the transaction assessment service deciding whether particular electronic transactions are approved for processing by an electronic service provider.

20 Claims, 13 Drawing Sheets

CONTACT GRAPH SCORING SYSTEM

BACKGROUND

Field of the Disclosure

This disclosure relates to machine learning architectures. More particularly, this disclosure relates to machine learning architectures that generate a user score based on a contact graph generated from a user's contact list, in various embodiments.

Related Art

Machine learning and artificial intelligence techniques can be used to improve various aspects of decision making. Machine learning techniques often involve using available data to construct a classifier/model that can produce an output (e.g. a decision) based on particular input data. Training data (e.g. known data and/or previously classified data) may be used such that the resulting trained classifier is capable of rendering a decision on unknown data. In some instances, machine learning can be applied to allow a computer system to make an assessment regarding a user requesting a service provided by an electronic service provider device to determine whether that user presents a security risk, to determine whether the user is or likely to be in compliance with a regulation, to provision a service product, and/or to personalize the service for the user. While various such machine learning models can be constructed, Applicant recognizes that these machine learning decision models can be improved through new applications and techniques regarding particular data, as discussed below.

Figure 1:
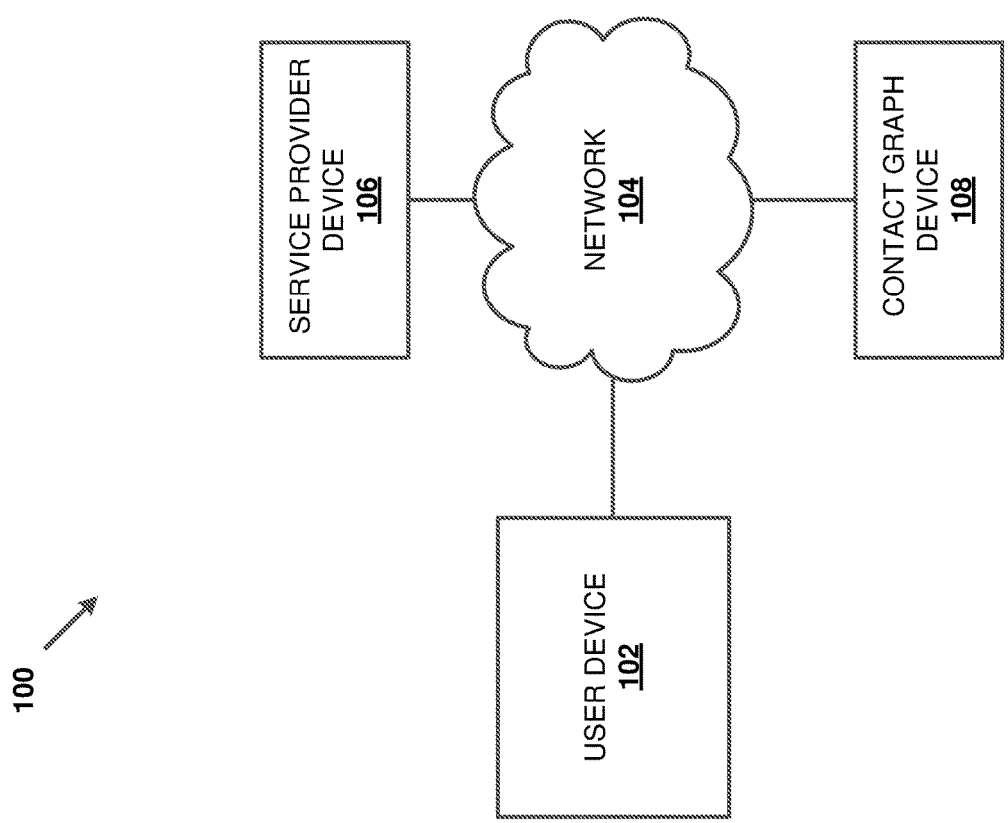
FIG. 1 is a block diagram illustrating a contact graph scoring system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes methods and systems for using machine learning with a classifier to generate a user score for a user based on that user's contact list stored on a user device that the user is using to request a service from an electronic service provider, according to various embodiments. These methods may be particularly advantageous in detecting users that may be incorrectly categorized as a risk to an online electronic transaction service, and can empower those users to participate in the transaction service when one or more of their transactions might otherwise have been incorrectly denied as a risk. These techniques are also useful in detecting users that potentially present a security risk for the electronic service provider, determining that a user will satisfy a compliance regulation, personalizing a service for a user, provisioning service products for the user, completing transactions, and/or other service related settings that can be determined from a user's contact list that would be apparent to one of skill in the art in possession of the present disclosure.

As a brief simplified example, a user may sign up for an account with the electronic service provider. The electronic service provider may have a risk vetting platform to verify whether the user presents a risk (e.g., a security risk, a financial risk, etc.) for that electronic service provider, and/or for particular electronic transactions conducted via the service provider. Risk vetting platforms may utilize data available from credit bureaus, transaction history (if the risk vetting is for a subsequent service after the user has created an account), and machine-learning algorithms that rely on pattern recognition of similar customers. However, in some instances, the amount of data available to a risk vetting platform when the user signs up for the account may be limited. Also, in some instances further compliance checks may be required.

Applicant recognizes that there is an opportunity to augment risk vetting platforms that do not consider the contacts of the user when performing a risk analysis of the user, which can provide valuable insight for risk analysis and service personalization. In particular, users without device history, transaction history, and/or credit history may be judged as higher risk by certain evaluation systems. But as has been discovered by the inventors of the present disclosure, there is a correlation between a risk of a user and whether that user's contacts as stored on a digital device with which the user is transacting have exhibited actions that are considered risky. For example, if a user that has several contacts that have had their accounts suspended or have had other discipline actions taken against them, then the user may be of a higher risk than a user that has several contacts that have a pristine record with the service provider and/or have undergone higher levels of verification (e.g., a Know Your Customer (KYC) process).

According to various embodiments of the disclosure, a contact graph scoring system may adopt a machine learning approach to determine a user score that may be used by risk vetting platforms, compliance vetting platforms, personalization platforms, and/or other platforms where a user score for a user, based on behaviors of contacts of that user, may be beneficial. In some embodiments, the contact graph scoring system may train a contact graph model using a machine learning algorithm (e.g., a random forest classifier, artificial neural network, or other). The machine learning algorithm may perform supervised training of the contact graph model by using contact graphs of users associated with a service that are labeled according to the desired output (e.g., risky or not risky, prefers one service over another service, complies with a regulation or does not comply with the regulation, etc.). The contact graph model may be verified and tuned to obtain more accurate results when the contact graph model is used. As such, a trained contact graph model is generated that may be used when analyzing an unknown contact graph (e.g., first-degree contacts, second-degree contacts and known information about those first-degree contacts and second-degree contacts including historical interactions between those contacts and the electronic service provider) associated with a user.

When a contact graph is generated and received by a contact graph device, a scoring engine may access the trained contact graph model and use the trained contact graph model and the contact graph to output a user score and/or a binary user result. The user score may be provided to a risk vetting platform, a compliance vetting platform, a personalization platform, and/or any other platform that may use the user score when making a determination about a user and that user's interactions with an electronic service. For example, a risk vetting platform may obtain the results as well as other platforms of one or more service providers.

As such, the systems and methods of the present disclosure improve security of an electronic service. Account security and computer security may be improved in some embodiments by making a more accurate assessment as to whether a user is legitimate in their attempts to use an online electronic transaction service (or rather, for example, if a malicious actor was attempting to perform an unauthorized account takeover). The systems and methods also provide a distributed solution that can provide a user score to any number of services and based on the specific service. By separating the scoring engine from the various service platforms that may use the user score generated by the scoring engine, the systems and methods provide for a platform having a high performance (e.g. being able to service hundreds of billions of vertices and edges distributed across a multi-machine cluster), a high availability, high ingest rate (e.g., greater than 1000 updates/sec), and/or other technological advantages that would be apparent to one of skill in the art in possession of the present disclosure.

Referring now to FIG. 1, an embodiment of a contact graph scoring system 100 is illustrated. In an embodiment, the contact graph scoring system 100 may include a user device 102 coupled to a network 104. Furthermore, the contact graph scoring system 100 may include one or more service provider devices (e.g., the service provider device 106 illustrated in FIG. 1) coupled to the network 104. Further still, the contact graph scoring system 100 may include a contact graph device 108 coupled to the network 104. In a specific example, the service provider device 106 may belong to an on-line or mobile payment service provider such as, for example, PayPal®, Inc. of San Jose, Calif. As described herein, the service provider device 106 may be configured to perform a service via an application on the user device 102.

While performing a service, the service provider device 106 may use a user score that is used by the service provider device 106 to perform one or more operations associated with the service. For example, the service provider device 106 may be onboarding a user associated with the user device 102 for a service provided by the service provider device 106, provisioning a service product provided by the service provider device 106 for the user of the user device 102, conducting a transaction for the user of the user device 102, determining whether the user satisfies a compliance regulation, and/or other interactions that may require a risk assessment of the user that would be apparent to one of skill in the art in possession of the present disclosure. In other examples, the service provider device 106 may be personalizing a service provided by the service provider device 106 and more about the user of the user device such as user preferences may be required.

The contact graph device 108 may generate a user score (e.g., a user risk score and/or a user preference score) based on the contacts stored by the user in the user device 102 or otherwise associated with the user and accessible by the contact graph device 108, those contacts being stored in a contact graph database, contacts of contacts stored in the contact graph database, and a contact graph model that is trained using a machine learning algorithm. The contact graph device 108 may provide the user score to the service provider device 106 via the network 104 such that the service provider device 106 may use the user score in assessment engines for that service provider device 106. In various embodiments, the contact graph device 108 may be included in the service provider device 106 as a contact graph platform/application hosted by the service provider device 106. While a specific example of the contact graph scoring system 100 is illustrated, one of skill in the art in possession of the present disclosure will recognize that a wide variety of contact graph scoring systems having various configurations of networks, user devices, service provider devices, and contact graph devices that may operate to provide the systems and methods discussed herein without departing from the scope of the present disclosure.

Figure 2:
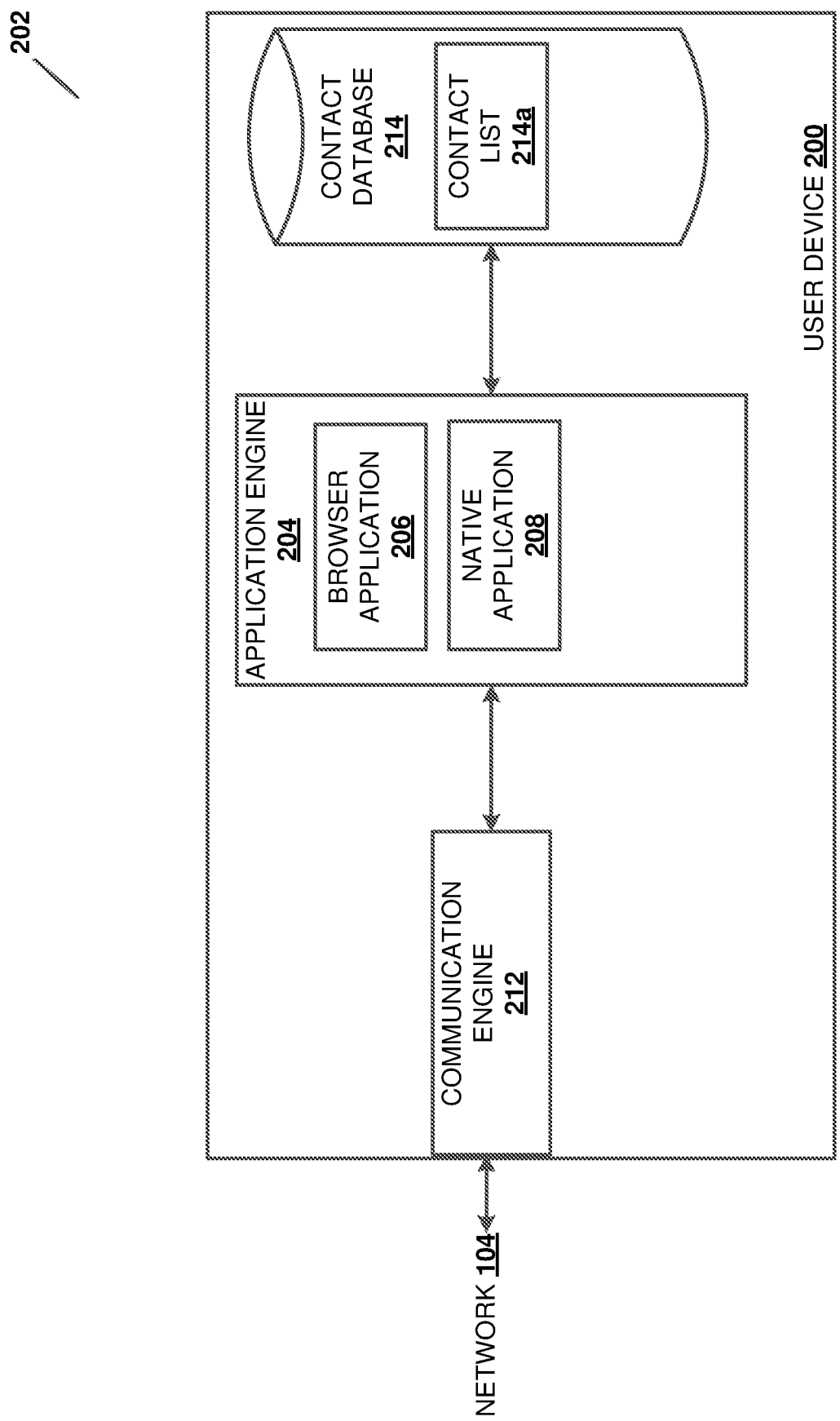
FIG. 2 is a schematic view illustrating an embodiment of a user device used in the contact graph scoring system of FIG. 1.

Referring now to FIG. 2, an embodiment of a user device 200 is illustrated that may be the user device 102 discussed above with reference to FIG. 1, and which may be provided by a desktop computing system, a laptop/notebook computing system, a tablet computing system, a mobile phone, a wearable device, and/or other user devices that would be apparent to one of skill in the art in possession of the present disclosure. However, one of skill in the art in possession of the present disclosure will recognize that the user device 200 may be provided by any of a variety of computing devices in the different examples discussed below. In the illustrated embodiment, the user device 200 includes a chassis 202 that houses the components of the user device 200, only some of which are illustrated in FIG. 2. For example, the chassis 202 may house a processing system (not illustrated) and a non-transitory memory system (not illustrated) that includes instructions that, when executed by the processing system, cause the processing system to provide an application engine 204 that is configured to perform the functions of the application engines and user devices discussed below. In a specific example, the application engine 204 is configured to provide a browser application 206 and/or a native application 208, although one of skill in the art in possession of the present disclosure will recognize that other applications and computing device functionality may be enabled by the application engine 204 as well. In various embodiments, application engine 204 may be an operating system of a device (e.g. iOS™, Android™ OS, Windows™, etc.) or other application that provides a software application that may communicate with a service application on a server device.

The chassis 202 may further house a communication engine 212 that is coupled to the application engine 204 (e.g., via a coupling between the communication engine 212 and the processing system). The communication engine 212 may include software or instructions that are stored on a computer-readable medium and that allow the user device 200 to send and receive information over the network 104. The chassis 202 may also house a storage system that includes a contact database 214 that is coupled to the application engine 204 (e.g., via a coupling between the storage system and the processing system). The contact database 214 may store a contact list 214a associated with the user of the user device 200 that may include a list of contact entries that may each include a name, a phone number, an email address, a business affiliation, and/or any other contact information that would be apparent to one of skill in the art in possession of the present disclosure. While the contact database 214 has been illustrated as housed in the chassis 202 of the user device 200, one of skill in the art will recognize that it may be connected to the application engine 204 through the network 104 without departing from the scope of the present disclosure.

Figure 3:
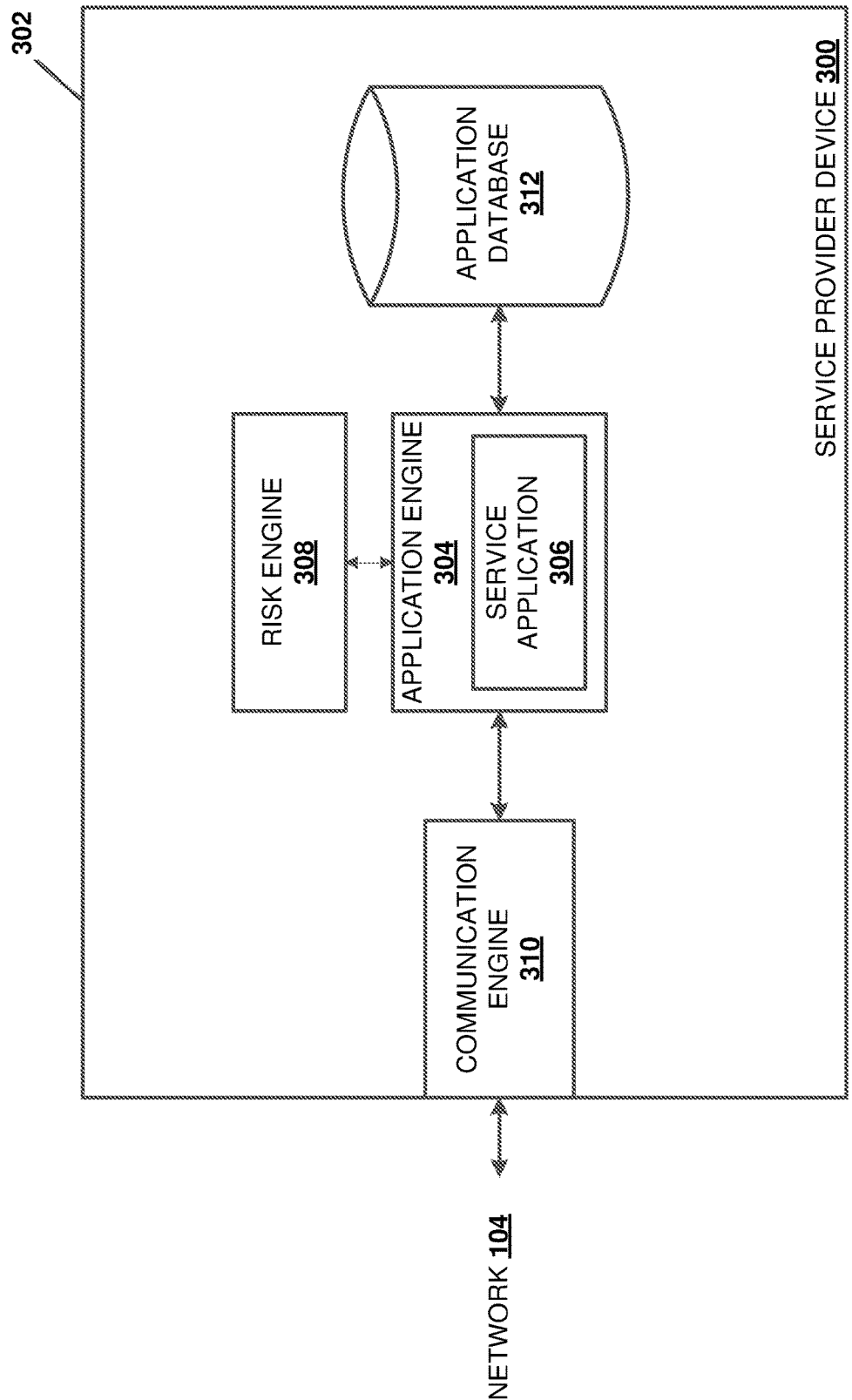
FIG. 3 is a schematic view illustrating an embodiment of a service provider device in the contact graph scoring system of FIG. 1.

Referring now to FIG. 3, an embodiment of a service provider device 300 is illustrated that may be the service provider device 106 discussed above with reference to FIG. 1, and which may be provided by one or more server devices. In a specific example, the service provider device 300 may be controlled by an on-line or mobile payment service provider such as, for example, PayPal®, Inc. of San Jose, Calif. In the illustrated embodiment, the service provider device 300 includes a chassis 302 that houses the components of the service provider device 300, only some of which are illustrated in FIG. 3. For example, the chassis 302 may house a processing system (not illustrated) and a non-transitory memory system (not illustrated) that includes instructions that, when executed by the processing system, cause the processing system to provide an application engine 304, such as an operating system, that is configured to perform the functions of the application engines and the service provider devices discussed below. In a specific example, the application engine 304 is configured to provide a service application 306 (e.g., a software application that provides a service to a client device) discussed below, although one of skill in the art in possession of the present disclosure will recognize that other applications and computing device functionality may be enabled by the service application engine 306 as well. In various embodiments, the processing system (not illustrated) and the non-transitory memory system (not illustrated) that includes instructions that, when executed by the processing system, may cause the processing system to provide a risk engine 308 that is configured to perform the functions of the risk engines and the service provider devices discussed below. For example, the risk engine 308 may use a user score generated by the contact graph device 108 of FIG. 1 to perform a risk analysis of a user that is interacting with the service application engine 306 via the user device 102 of FIG. 1.

The chassis 302 may further house a communication engine 310 that is coupled to the application engine 304 (e.g., via a coupling between the communication engine 310 and the processing system) and that is configured to provide for communication through the network 104 as detailed below. The chassis 302 may also house a storage system that includes an application database 312 that is coupled to the application engine 304 (e.g., via a coupling between the storage system and the processing system). The application database 312 may store web pages, images, videos, audio, other content, user profiles, user identifiers, user permissions, user information, user account information, user transaction information, and/or other data used by the service application engine 306 to provide services and perform the risk analysis functionality discussed below. While the application database 312 has been illustrated as housed in the chassis 302 of the service provider device 300, one of skill in the art will recognize that the application database 312 may be connected to the service application engine 306 and/or risk engine 308 through the network 104 without departing from the scope of the present disclosure.

Figure 4:
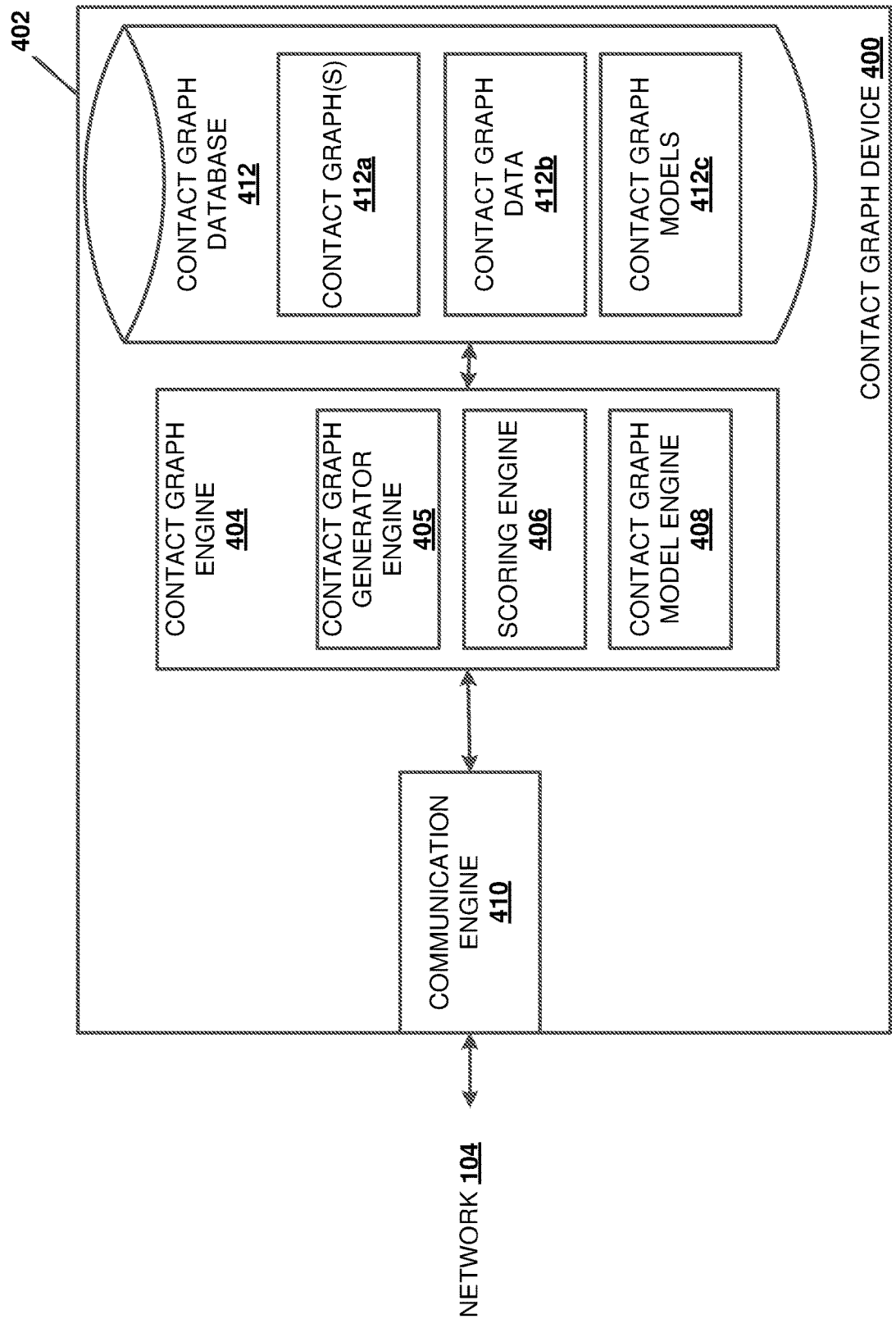
FIG. 4 is a schematic view illustrating an embodiment of a contact graph device in the contact graph scoring system of FIG. 1.

Referring now to FIG. 4, an embodiment of a contact graph device 400 is illustrated that may be the contact graph device 108 discussed above with reference to FIG. 1, and which may be provided by one or more server devices or other computing devices. Contact graph device 400 may be a smartphone such as iPhone™, Android™ phone, or other such device, in various embodiments. In the illustrated embodiment, the contact graph device 400 includes a chassis 402 that houses the components of the contact graph device 400, only some of which are illustrated in FIG. 4. For example, the chassis 402 may house a processing system (not illustrated) and a non-transitory memory system (not illustrated) that includes instructions that, when executed by the processing system, cause the processing system to provide a contact graph engine 404 that is configured to perform the functions of the contact graph engines and the contact graph devices discussed below.

In a specific example, the contact graph engine 404 is configured to provide a contact graph generator engine 405, a scoring engine 406, a contact graph model engine 408, discussed below, although one of skill in the art in possession of the present disclosure will recognize that other applications and computing device functionality may be enabled by the contact graph engine 404 as well. For example, the contact graph generator engine 405 may be configured to generate a contact graph based on user's contact list. This contact list may be wholly or partially stored in a memory of a smartphone and/or a SIM card of the smartphone; it may also be wholly or partially stored online (e.g. in a user account for the smartphone). The scoring engine 406 may be used to generate a user score for a user based on that user's contact graph, a contact graph model, and/or any other information that would be apparent to one of skill in the art in possession of the present disclosure. The contact graph model engine 408 may be used to generate/train contact graph models and dynamically update/train the models using a machine learning algorithm and historical user contacts and user scores.

The chassis 402 may further house a communication engine 410 that is coupled to the contact graph engine 404 (e.g., via a coupling between the communication engine 410 and the processing system) and that is configured to provide for communication through the network 104 as detailed below. The chassis 402 may also house a storage system that includes a contact graph database 412 that is coupled to the contact graph engine 404 (e.g., via a coupling between the storage system and the processing system). The contact graph database 412 may store contact graphs 412a, contact graph data 412b, contact graph models 412c, and/or any other instructions and/or data that would be apparent to one of skill in the art in possession of the present disclosure to perform the user scoring and contact graph model generation functionality, discussed below. While the contact graph database 412 has been illustrated as housed in the chassis 402 of the contact graph device 400, one of skill in the art will recognize that the contact graph database 412 may be connected to the contact graph engine 404 through the network 104 without departing from the scope of the present disclosure.

Figure 5:
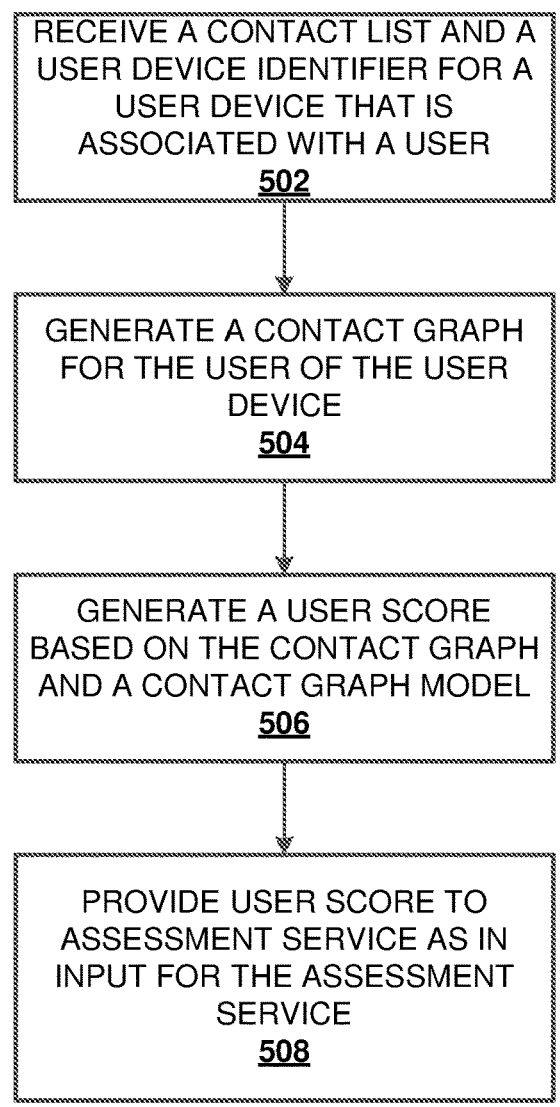
FIG. 5 is a flowchart illustrating a method of generating a user score based on a contact list of a user according to an embodiment of the present disclosure.

Referring now to FIG. 5, a method 500 for generating a user score for a user based on contacts associated with the user is illustrated according to various embodiments. Operations described relative to FIG. 5 may be performed, in various embodiments, by any suitable computer system and/or combination of computer systems, included in contact graph scoring system 100. For convenience and ease of explanation, however, operations described below will simply be discussed relative to the contact graph device 108/400. Further, various elements of operations discussed below may be modified, omitted, and/or used in a different manner or different order than that indicated. Thus, in some embodiments, the contact graph device 108/400 may perform one or more aspects described below, while another system might perform one or more other aspects.

The method 500 begins at block 502 where a contact list and a user device identifier for a user device that is associated with a user are received. In an embodiment, at block 502, the contact graph device 108/400 may receive the contact list 214a and a user device identifier for the user device 102/200 via the network 104. The contact list 214a and the user device identifier may be provided in a data object such as, for example, a JavaScript Object Notion (JSON) format. However, other formats may be contemplated by one of skill in the art in possession of the present disclosure. The contact list 214a may include a plurality of contact entries that may each include a name, a contact identifier such as a phone number, an email address, and/or any other contact identifier, a business affiliation, a physical mailing address, and/or any other contact information that would be apparent to one of skill in the art in possession of the present disclosure. The user device identifier may include the phone number associated with the user device 102/200 and/or any other identifier associated with the user device 102/200 such as, for example, a Media Access Control (MAC) address, an International Mobile Equipment Identifier (IMEI), a Mobile Identification Number (MIN) or a Mobile Subscription Identification Number (MSIN), a Subscriber Identification Module (SIM), an International Mobile Subscriber Identification (IMSI) number, an Internet Protocol (IP) address, an Mobile Subscriber Integrated Services Digital Network (MSISDN) number, and/or any other user device identifier that would be apparent to one of skill in the art in possession of the present disclosure. In various embodiments, the user device identifier should match a user device identifier type that is provided by the user device identifiers included in the contact list 214a.

In various embodiments, the contact graph device 108/400 may receive the contact list 214a and the user device identifier of the user device 102/200 directly from the user device 102/200. In another embodiment, a phone service provider might share a contact list directly with a computer system performing method 500. In yet other embodiments, the service provider device 106/300 may provide the contact list 214a and the user device identifier for the user device 102/200 to the contact graph device 108. For example and referring to FIG. 6, an example sequence diagram 600 is illustrated that illustrates an example communication sequence for the contact graph scoring system 100. At step 602 and prior to block 502 of the method 500 of FIG. 5, the user device 102/200 may interact with the service provider device 106/300. For example, the interaction at step 602 may be a service request for a service provided by the service application 306 of the service provider device 106/300 via the browser application 206 and/or the native application 208 of the user device 102/200. For example, the service request may be a request to onboard the user of the user device 102/200 with the service application 306 (e.g., create a user account with the service provider of the service application 306). In another example, the service request may be a request to a specific service product offered by the service application that may require more risk analysis or more knowledge about the user than other service products offered by the service application 306. In yet another example, the service request may be a request to complete a transaction that requires some risk assessment of the user of the user device 102/200 that is completing the transaction. While specific service requests are illustrated and discussed, one of skill in the art in possession of the present disclosure will recognize that the service request may be for any service that requires or benefits from risk analysis, user personalization, compliance verification, product provisioning, and/or some other user specific information to complete the service. For the sake of clarity, examples discussed herein will refer to service requests and services provided by the service provider device 106/300 that require or benefit from a risk analysis of the user to complete a service request.

Figure 7:
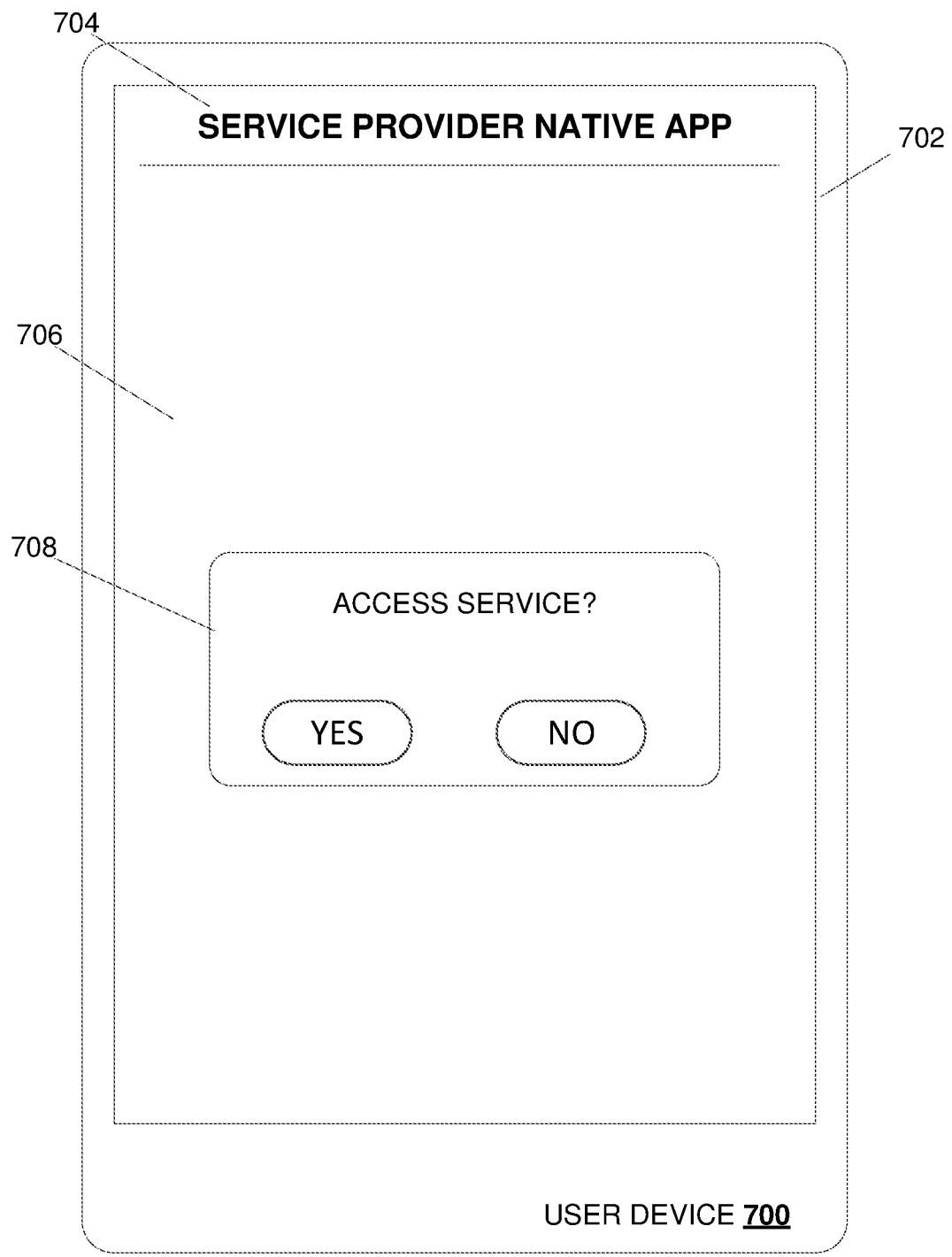
FIG. 7 is a screenshot of an embodiment of the user device of FIG. 2 displaying a service request option on a native application of a service provider during the method of FIG. 5.

Referring to FIG. 7, a user device 700 that includes a display screen 702 is illustrated. The user device 700 may be any of the user devices 102/200 described above, and includes a native application 704 that may be used to access a service application 706 provided by an electronic service provider that may be associated with the service provider device 106/300. The service application 706 may provide graphical element 708 for the user to select to access a service provided by the service application that requires a risk analysis. Upon the user selecting the option to request the service via the graphical element 708, the native application 704 may send the service request at step 602.

Referring back to FIG. 6, at step 604, the service provider device 106/300 may determine that the service request received at step 602 requires a user score to make a determination for completing the service request. For example, the service application 306 may make a determination that a risk decision is required from the risk engine 308. The risk engine 308 may require a user score for the user of the user device 102/200. The user score may be provided by the contact graph device 108/400 and the risk engine 308 may provide a user score request, in step 604, to the contract graph device 108/400.

Figure 8:
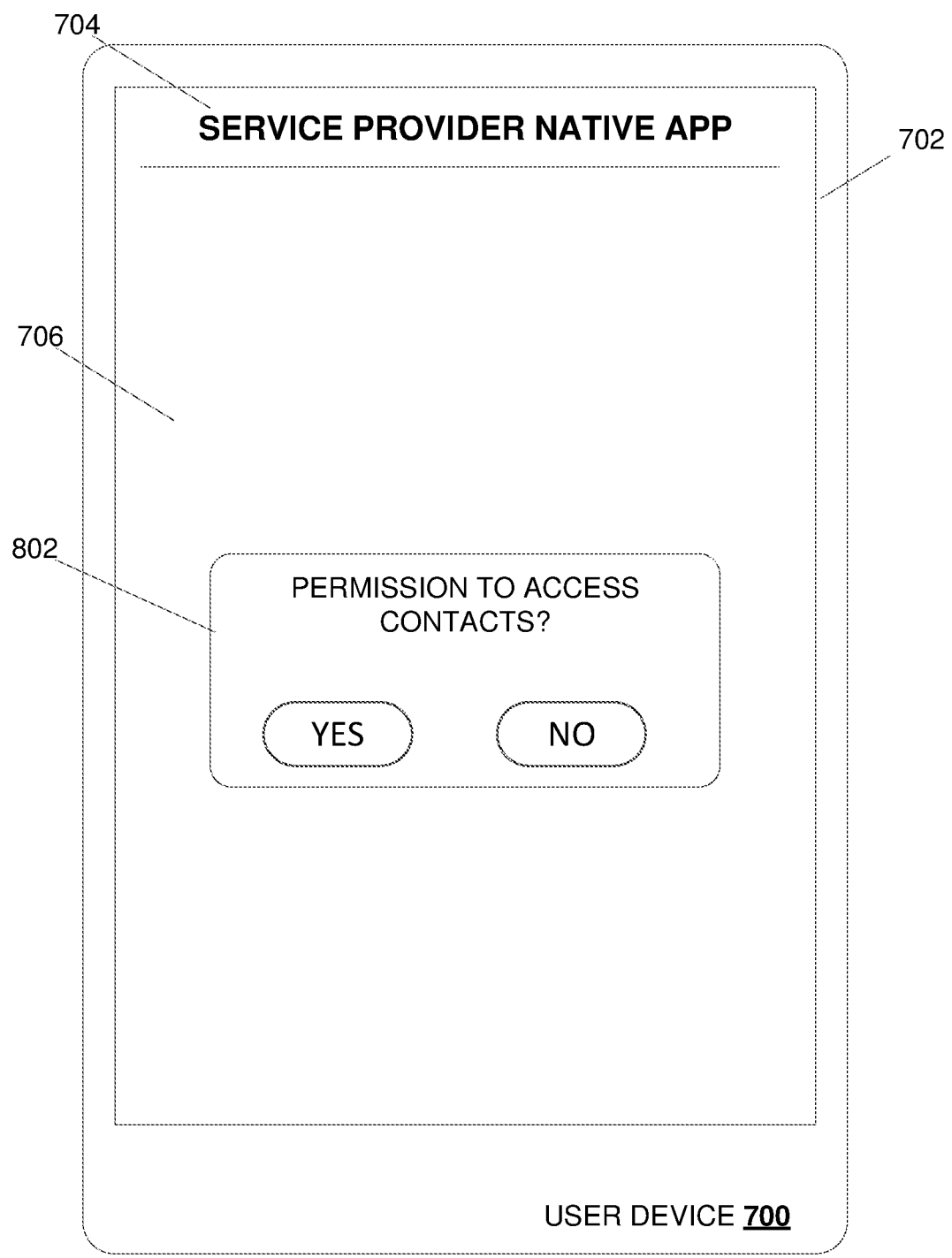
FIG. 8 is a screenshot of an embodiment of the user device of FIG. 2 displaying an option to provide access to a contact list via a native application of a service provider during the method of FIG. 5.

At step 606, the contact graph device 108/400 may provide a contact list request to the user device 102/200. In various examples and referring to FIG. 8, the user device 700 may receive the contact list request via the native application 704 or via another application provided on the user device 700 that is associated with the contact graph device 108/400. The native application 704 or an operating system of the user device 700 may display on the display screen 702 a graphical element 802 requesting permission for the native application 704 to access the contact list 214a on the user device 700. If the user gives permission, the native application, via an operating system Application Programming Interface (API), may access the contact list 214a stored on the user device 700.

At step 608, in response to the contact list request and, in some embodiments, the user granting permission to access the contact list 214a, the user device 102/200 may provide the contact list 214a and the user device identifier to the contact graph device 108/400 to complete block 502 of method 500. In some embodiments, the native application 208 may communicate the contact list 214a and the user device identifier to the contact graph device 108/400 via a contact graph API provided by the contact graph device 108/400.

Figure 6:
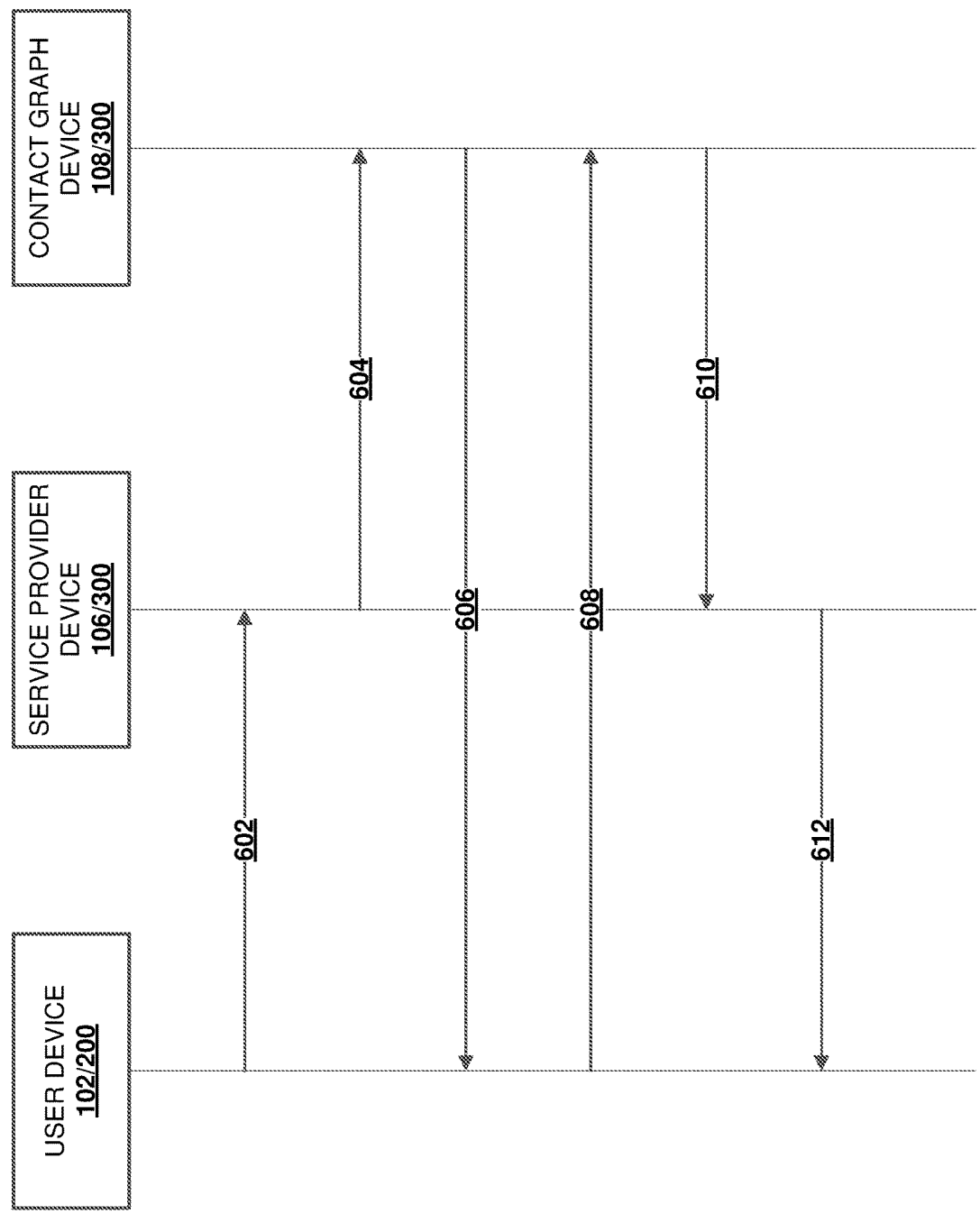
FIG. 6 is a sequence diagram illustrating an embodiment of communications in the contact graph scoring system during the method of FIG. 5.

While a specific sequence of communications is illustrated in the example sequence diagram 600 of FIG. 6, one of skill in the in possession of the present disclosure that other communications sequences may be contemplated when providing the contact list 214a and the user device identifier for the user device 102/200. For example, instead of step 604 and step 606, the service provider device 106/300 may send the contact list request to the user device 102/200 that causes that user device 102/200 to provide the contact list 214a and the user device identifier to the contact graph device at step 608. In another example, subsequent to step 604, the contact graph device 108 may provide the contact list request to the service provider device 106/300 and the service provider device 106/300 may forward the contact list request to the user device 102/200. In yet other embodiments, the user device 102/200 may provide the contact list 214a and the user device identifier for the user device 102/200 to the service provider device 106/300, which may forward the contact list 214a and the user device identifier for the user device 102/200 to the contact graph device 108/400. In yet other embodiments, the user device 102/200, when making the service request at step 602, may simultaneously provide the contact list 214a and the user device identifier to the service provider device 106/300 and/or the contact graph device 108/400 as the application engine 204 of the user device may include predefined instructions to do so.

Returning to FIG. 5, the method 500 then proceeds to block 504 where a contact graph for the user of the user device is generated by associating the user device identifier with the first set of the user device identifiers of the contact list. In an embodiment, at block 504, the contact graph generator engine may generate a contact graph for the user of the user device 102/200 by associating the user device identifier with the user device identifiers found in the contact entries provided in the contact list 214a. For example, the phone number associated with the user device 102/200 may be associated with the phone numbers for the contact entries found in the contact list 214a. While like type user device identifiers/use identifiers are associated with each other to generate the contact graph, varying user device identifiers/user identifiers may be used to generate a contact graph. For example, an email address of the user obtained from the user device may be associated with the phone numbers of the contact entries found in the contact list 214a. The user device identifiers of the contact list 214a may be designated as first-degree contacts of the user device identifier for the user device 102/200 and this association may be stored as a contact graph 412a in the contact graph database 412 of FIG. 4. User device identifier 102/200 and its association with the contact list 214a may be stored as contact graph data 412b in the contact graph database 412 as well as any user information about the user or contact information about the contacts.

The contact graph 412a itself may include a table, a graphical representation, and/or other data object that would be apparent to one of skill in the art in possession of the present disclosure. For example, if the contact graph 412a is in a graph format, the contact graph 412a may include nodes and edges connecting the nodes. The nodes may include each of the entities represented in the graph (for example, individuals in the contact list would appear as nodes in the graph with specific attributes/parameters associated with them like phone number, address, service provider products they use, etc.). The relationship between the nodes are represented as edges (for example, if User A is present in User B's contact list, then User A and User B are connected via an edge).

Generally, the contact graph 412a may include the user device identifier for the user device 102/200 as the root and any user information associated with the user and the user device identifier for the user device 102/200 such as location information (e.g., based on the phone number or location information provided by the user device 102/200), demographic information, user device information, and/or any other information that would be apparent to one of skill in the art in possession of the present disclosure. The user device identifiers of the contacts list 214a may link to the user device identifier of the user device 102/200. The contact graph generator engine 405 may link contact information from the contact list 214a for those contacts to their respective user device identifiers.

In various embodiments, the contact graph generator engine 405 may search for each of the user device identifiers in the contact entries of the contact list within the contact graphs 412a and/or contact graph data 412b. As discussed above, the contact graph data 412b may store data about current or past users of the service application 306 of the service provider device 106/300, which may include contact lists and contact graphs for those users. The scoring engine 406 may link any user information found the contact graph data 412b to the contact graph 412a for the user of the user device 102/200. The contact graph generator engine 405 may also link any user device identifiers that are included in contact lists associated with the user device identifiers that are considered first-degree contacts of the user device identifier for the user device 102/200. These user device identifiers may be defined as second-degree contacts. In some instances, a first-degree contact may have some or all of the same contact(s) as the user device 102/200 and that contact may be maintained as a first-degree contact of the user device 102/200 and the link may be noted between the first-degree contacts may be stored. For example, a circle of friends may each have at least some similar contacts, which may be of interest to the scoring engine 406 as discussed below. In any case, user/contact information associated with those second-degree contacts may be linked to the user device identifiers of each of the second-degree contacts. In some embodiments, the second-degree contacts may only be added to the contact graph for the user device 102/200 if the first-degree contact is associated with the service that the user of the user device 102/200 is requesting in the service request. N-degrees of contacts may be added to the contact graph 412a for the user device 102/200 and may be determine based on a predetermined instruction. As discussed below, the higher degree of contacts in the contact graph, the less weight those contacts may be contribute to the user score.

Figure 9A:
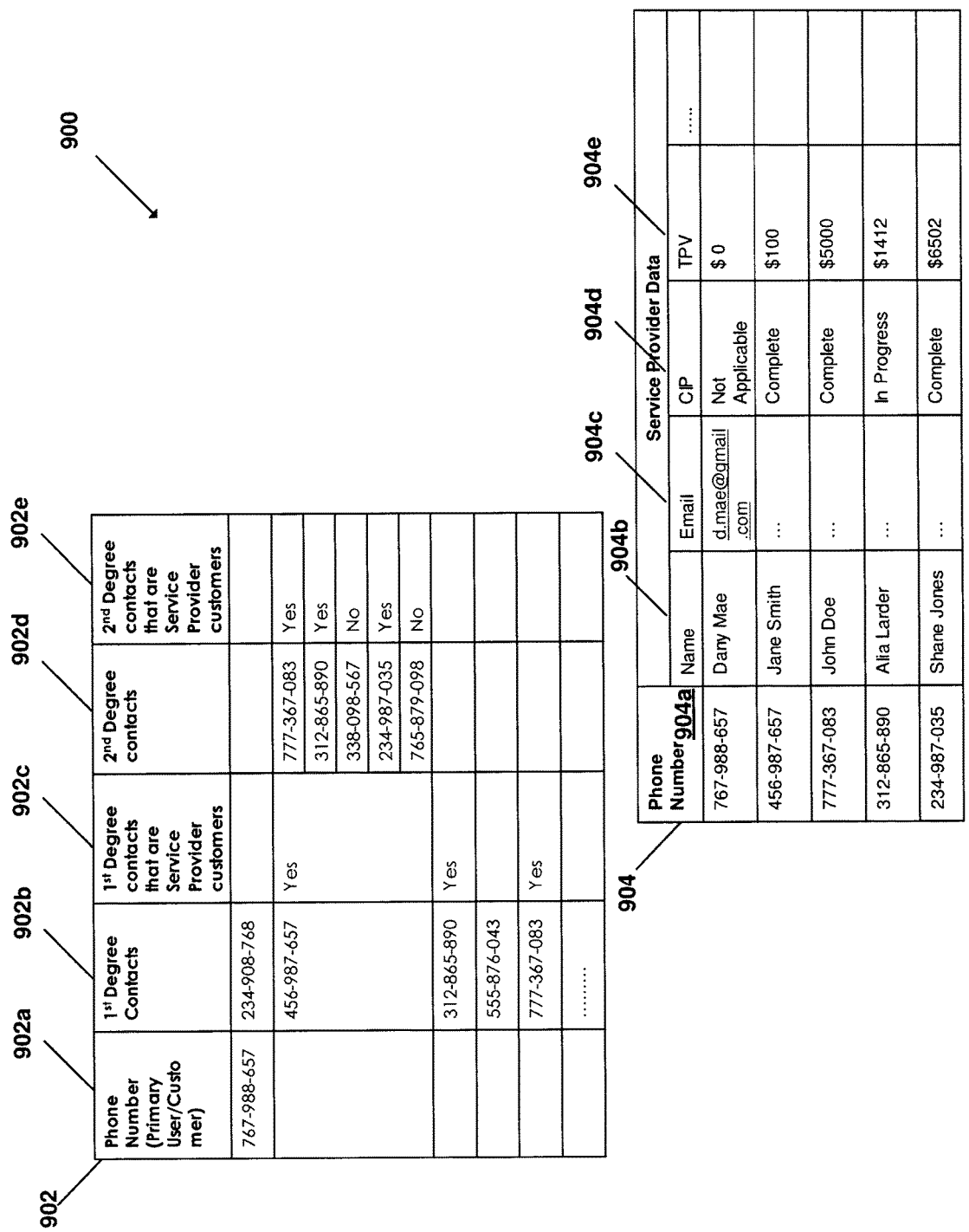
FIGS. 9A and 9B illustrate an example of a contact graph according to an embodiment of the present disclosure.
Figure 9B:
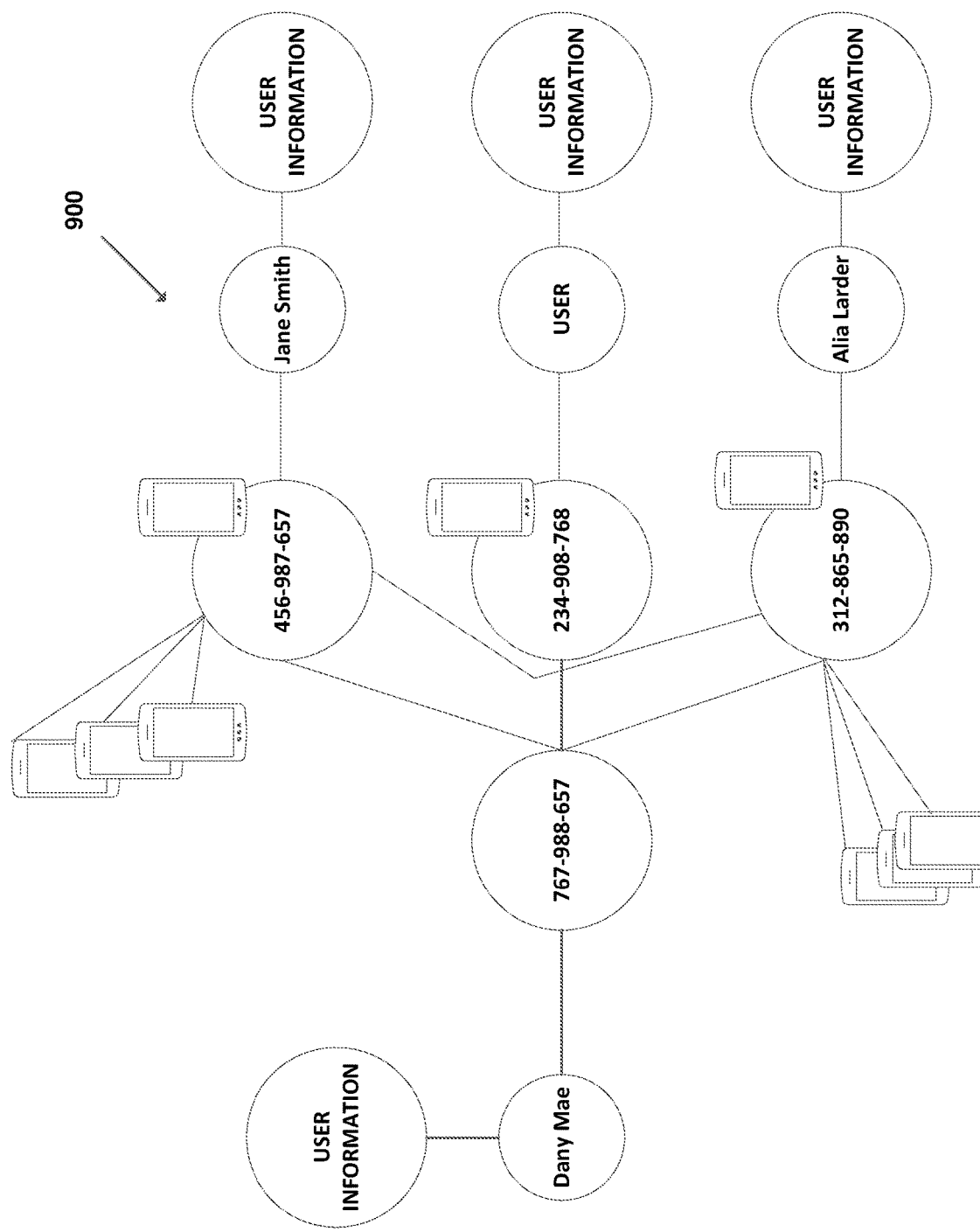

Referring now to FIGS. 9A and 9B, an example of a contact graph 900 for the user device 102/200 is illustrated. In FIG. 9A, the contact graph 900 may include a contact graph table 902 and a data table 904. As can be seen from the contact graph table, a phone number (e.g., "767-988-657") for the user device 102/200 is in the contact graph table column 902a. The contact graph table column 902b includes the phone numbers of first-degree contacts that were in the contact list 214a. The contact graph table column 902c may include information as to whether the first-degree contacts are associated with the service provider of the service provider device 106/300 when the contact graph generator engine 405 searched for those phone numbers in the contact graphs 412a and/or the contact graph data 412b. If the phone number of a first-degree contact is associated with the service provider, then the contact graph generator engine 405 may add the contact list for that first-degree contact in the contact graph table column 902d as second-degree contacts. For example, the phone number "456-987-657" may be associated with the service provider of the service provider device 106/300 and the contacts associated with that phone number that are stored in the contact graphs 412a and/or the contact graph data 412b may be added to the second-degree contacts in the contact graph table column 902d. The contact graph generator engine 405 may then determine whether those second-degree contacts in the contact graph table column 902d are associated with the service provider of the service provider device 106/300 using the contact graphs 412a and/or the contact graph data 412b. The contact graph generator engine 405 may insert, in the contact graph table column 902e, information as to whether the second-degree contacts are associated with the service provider of the service provider device 106/300. In various embodiments, the contact graph generator engine 405 of the contact graph device 108/400 may make a determination for the contact graph table column 902c and 902e based on whether the contacts are associated with the service being requested by the user device 102/200 as the service provider may provide a plurality of services and the service provider device is only interested with the users that use the particular service requested by the user of the user device 102/200.

The contact graph 900 may also include a data table 904 that includes data for the user of the user device 102/200, the first-degree contacts, and the second-degree contacts that are associated with the service provider and/or that are associated with the service provided by the service provider to which the user device 102/200 is requesting access. In the illustrated example, the data table may include the user device identifier for the user device 102/200 and the user device identifiers/phone numbers for each of the first-degree contacts and the second-degree contacts in data table column 904a. The data table column 904b may include a respective name of those users/contacts, and the data table column 904c may include a respective email address for those users/contacts in data table column 904a. Data table columns 904d and 904e may include respective service information for contacts in the data table column 904a that may be based on the service provided by the service provider device 106/300 being requested by the user device 102/200. For example, the data column 904d may include Customer Identification Program (CIP) data and the data column 904e may include Total Payment Volume (TPV) representing the overall transactions conducted using the service provider. While a specific contact graph 900 that includes the contact graph table 902 and the data table 904 is illustrated, one of skill in the art in possession of the present disclosure will recognize that other information that is relevant to the service being requested by the user device 102/200 may be included in the contact graph table 902 and the data table 904 without departing from the scope of the present disclosure.

Referring to FIG. 9B, the contact graph 900 is partially illustrated as a node-link diagram 906. The node-link diagram 906 may represent the information in the contact graph table 902 and the data table 904 graphically.

Referring back to FIG. 5, the method 500 then proceeds to block 506, where a user score is generated based on user information associated with the at least the portion of the first set of the user device identifiers in the contact database, the contact graph, and a contact graph model. In an embodiment, at block 506, the scoring engine 406 may determine a user score for the user of the user device 102/200. The user score may be determined using a contact graph model of the contact graph models 412c and the contact graph 412a determined at block 504. The contact graph model may be selected based on the service being requested from the service provider device 106/300 by the user device 102/200. As discussed below in method 1000 of FIG. 10, the contact graph model may be generated by the contact graph model engine 408 and stored in the contact graph database 412. The scoring engine 406 may use the contact graph model and the contact graph generated by the contact graph generator engine 405 for the user of the user device 102/200 to generate a user score for the user of the user device 102/200. For example, the user score may include a risk score used in determining risk by the service provider device 106/200 for fraud prevention, identity verification, product provisioning, transaction fraud prevention, and/or other safe. In other embodiments, the user score may include a preference score for personalization of the service for the user of the user device 102/200. However, other user scores that can be generated based on contact information associated with contacts in a user's contact list may be contemplated.

Using the contact graph and the contact graph model, the scoring engine 406 may input the user information for each of the first-degree contacts up to the user information for the nth-degree contacts associated with the user device identifier of the user device 102/200. In some examples, user information for first-degree contacts may be provided more weight than user information for second-degree contacts. User information for contacts in the contact graph that are both first-degree contacts and second-degree contacts may be given more weight than user information for contacts in the contact graph that are just first-degree contacts. The user information that the scoring engine 406 and the contact graph model may consider may include a length of time that contact has been associated with the service provider, location of the contact in relation to the location of the user of the user device 102/200, risk flags associated with the contacts, the degree of separation the contact is in relation to the user of the user device 102/200, service information associated with contacts (e.g., incomplete and completed requirements, number of transactions, dollar amount of transactions, etc.) and/or any number of variables that may define risk and/or preference that would be apparent to one of skill in the art in possession of the present disclosure. One of skill in the art in possession of the present disclosure will recognize that variables may vary depending on the use cases. However, for a specific model the variables may include a number of $1^{st}$ degree contacts that are service provider users, a number of $2^{nd}$ degree contacts that are service provider users, a number of $3^{rd}$ degree contacts that are service provider users, a TPV associated with $1^{st}$ degree contacts in the Service Provider Platform, a TPV associated with $2^{nd}$ degree contacts in the Service Provider Platform, TPV associated with $3^{rd}$ degree contacts in the Service Provider Platform, $1^{st}$ Degree contacts with verified identities in the Service Provider Platform, $2^{nd}$ Degree contacts with verified identities in the Service Provider Platform, 3$^{rd}$ Degree contacts with verified identities in the Service Provider Platform, 1$^{st}$ Degree Contacts (Service Provider users) with activity in last week, 1$^{st}$ Degree Contacts (Service Provider users) with activity in last month, 1$^{st}$ Degree Contacts (Service Provider users) with activity in last 3, 6, 12 months, 1$^{st}$ Degree contacts (Service Provider users)—match between address and their country of association with the Service Provider, and/or any other variable that may apparent to one of skill in the art in possession of the present disclosure.

In some embodiments, certain user information may be weighted more than other user information. For example, a user's difference in location with a contact may be weighted less than that contact's account status (e.g., a suspended account, a preferred account, etc.). The user score may be a score that is based on adding together scores of various sub-scores or any other scoring system that would be apparent to one of skill in the art in possession of the present disclosure to generate a value (e.g., a value of 80 of a possible 100). In other examples, the user score may be a binary output (e.g., a risky user or a non-risky user).

The method 500 may then proceed to block 508 where the user score is provided to an assessment service as in input for the assessment service deciding whether particular service requests are approved for processing by an electronic service provider. In an embodiment, at block 508, the scoring engine 406 of the contact graph device 108/400 may provide the user score for the user of the user device 102/200 to an assessment service that may use the user score for its own risk analysis that may consider other information and factors in making a decision for the service provider device 106/300. For example, the contact graph device 108/400 may provide the user score to one or more assessment services that request a user score. The user score may be provided via a user score API. For example, the risk engine 308 may obtain the user score via the network 104. In some embodiments, the risk engine 308 may be provided in a computing system that is separate from the service provider device 106/300 such that a plurality of service provider device 106/300 may obtain risk decisions from the risk engine 308. In other examples, compliance engines and/or preference engines may obtain the user score via the network 104 from the contact graph device 108/400. In other examples, the user score may be provided directly to the service provider device 106/300 to the service application 306.

As illustrated in FIG. 6 in step 610, the contact graph device 108/400 may provide the user score to the service provider device 106/300. The service application 306, based on the user score or based on a recommendation generated by an assessment engine such as the risk engine 308, may send a notification to the user device 102/200 indicating whether the service request was approved or denied in step 612. For example, if the risk engine 308 determines that the user associated with the user device 102/200 is risky because of the user score and other information, the service provider device 106/300 may provide the notification, at step 612, that the service request was unsuccessful, and in some examples, may indicate that further verification is necessary to complete the service request. In other examples, if the assessment engine determines that the user score for the user device 102/200 associated with the user is not risky, then the notification provided by the service application 306, at step 612, may indicate to the user device 102/200 that the service request was approved and the service application 306 may perform the service requested by the user device 102/200 to complete the method 500.

In various embodiments, the user score for the user of the user device 102/200 may be updated periodically and/or when a change to the contact graph occurs. For example, the user of the user device 102/200 may add or remove contacts from the contact list 214a, which may cause changes to the contact graph if the contact graph device 108/400 receives those updates, and thus the user score will be updated. In other examples, the contacts in the contact list 214a that were not previously associated with the service provider of the service provider device 106/300 may become associated with the service provider such that the service provider has user information that it is associated with those contacts. The contact graph device 108/400 may have received contacts associated with those contact, which may build out the contact graph for the user of the user device 102/200 and may result in an updated user score. In other examples, the contact graph data 412b may change over time. For example, one or more of the user's first-degree contacts may be flagged as risky by the service application 306 of the service provider device 106/300 and this information may be communicated to the contact graph device 108/400 and the contact graph data 412b may be updated, which may result in an updated user score. The scoring engine 406 may provide the updated user score to the assessment service provided by the electronic service provider of the service provider device 106/300.

Figure 10:
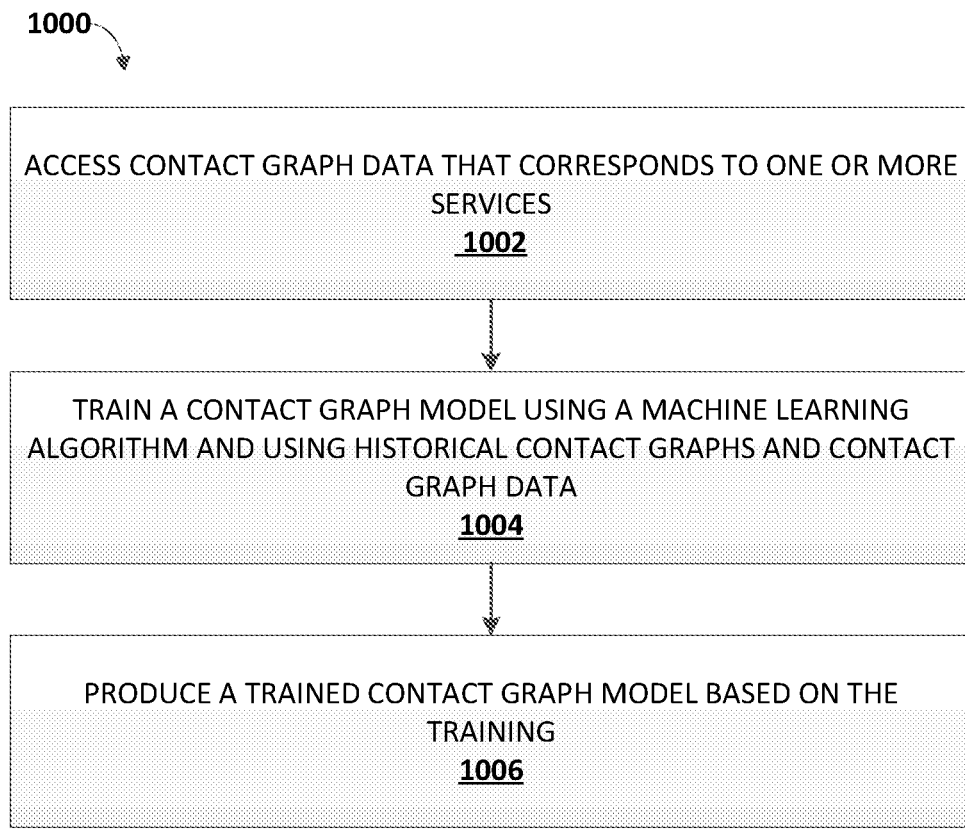
FIG. 10 is a flowchart illustrating a method of training a contact graph model used during the method of FIG. 5 according to an embodiment of the present disclosure.

Referring now to FIG. 10, a method 1000 for generating a contact graph model for a service that is used in determining a user score associated with a user of a user device is illustrated according to various embodiments of the present disclosure and with reference to block 506 of method 500. In various embodiments, the contact graph device 108/400 may execute some or all elements of the method 1000. However, it is contemplated that service provider device 106/300 may execute some or all elements of the method 1000. The method 1000 may begin at block 1002 where at least a portion of contact graph data that corresponds to one or more services provided by the service provider device are accessed. In an embodiment, at block 1002, the contact graph engine 404 may include the contact graph model engine 408. The contact graph model engine 408 may obtain contact graphs and contact graph data 412b for those contact graphs in the contact graphs 412a that are obtained and that are stored in the contact graph database 412 or other storage device that is coupled to the network 104. The contact graphs 412a that are accessed may be labeled according to a condition that is satisfied or not satisfied. However, in other embodiments, the data objects may be labeled as one of a plurality of categories. For example, the contact graphs 412a used for training the contact graph model 412c may be labeled as risky or not risky based on an outcome for giving access to the service associated with the contact graph model that is being generated to a user associated with those contact graphs. A risky contact graph may be associated with a user that was ultimately disciplined for interactions with the service while a non-risky or safe contact graph may be associated with a user that has not had any disciplinary issues. While specific embodiments of negative examples and positive examples in a binary classification problem are described, one of skill in the art in possession of the present disclosure will recognize that the contact graphs may be labeled according to various binary classifications that are associated with a condition on the contact graph scoring system 100 as well as more than two classifications. In various embodiments, for some services in the contact graph scoring system 100 when generating a particular contact graph model, a contact graph and its contact graph data may be labeled as a negative example, while for other services in the contact graph scoring system 100 when generating a particular contact graph model, the same contact graph may be labeled as a positive example.

The method 1000 may then proceed to block 1004 where the contact graph model is trained using a machine learning algorithm and using historical contact graphs and contact graph data. In an embodiment, at block 1004, the contact graph model engine 408 may train a contact graph model that is used by the scoring engine 406 for generating the user score using a machine-learning algorithm. For example, the machine learning algorithm is a random forest learning model in some embodiments, but may be any other type of learning model in various embodiments (e.g. logistic regression, gradient boosting tree (GBT), artificial neural network (ANN), support vector machine (SVM), multinomial naïve Bayes, and/or any other machine learning model that would be apparent to one of skill in the art in possession of the present disclosure). During a training process, the machine learning algorithm examines various labeled input data and adjusts certain internal parameters in order to optimize decision making capabilities, in various embodiments. The result is a trained classifier (e.g., a contact graph model of the contact graph models 412c) that can be used on unknown data (e.g., the contact graph generated for the user device 102/200).

Training the contact graph model, in the case of a random forest classifier, involves creating a number of decision trees based on the different graphs. Each individual decision tree may represent a subset of all known attribute values for the nodes and edges in the graph, which can help prevent overtraining. The leaves on the decision tree may result in a classification for a given contact graph and contact graph data, (e.g., a positive contact graph vs. negative contact graph). Various different criteria can be used to construct the decision trees. Information about the nodes in the graph and/or graph-level information can also be used in building the contact graph model. For example, the tree data structure can contain a percentage of contact graphs in the tree that were suspended, restricted, or terminated for fraudulent behavior (and this can further be broken down into first-degree contacts of that contact graph and/or second-degree contacts, for example). A contact graph that has a relatively high percentage (compared to "good" contact graphs) of fraudulent contacts that are immediately connected to it may have a much higher likelihood of being a fraudulent account itself. Second-degree contacts may have a weaker correlation, but still provide a positive correlation (e.g. the likelihood of fraud is higher when 30% of the second-degree contacts in a contact list have engaged in fraud vs. 30% of its third-degree nodes being known fraudsters). Nodes may therefore be labeled according to a classification (e.g. if the service provider device 106/300 determines an account to have engaged in fraud, it can be labeled as such and used in the graph as such).

Optimizing individual trees to predict on training data and then combining the results can produce a trained classifier that is then capable of assessing unlabeled data (e.g. determining whether an unknown user is likely to engage in risk like behavior). For example, hundreds or thousands of decision trees can be trained and used. If 1,950 out of 2,000 decision trees determine that a contact graph of a user device will engage in risky behavior, then this may be very likely to be the case for example. Individual decision trees can also be weighted (e.g. some trees may be more accurate than others in regard to the training data and can be weighted accordingly, where one tree might get 3.5 times the "votes" of another less accurate tree). Once a threshold is reached (which can be defined arbitrarily for a desired level of accuracy) then a decision can be reached. The trained contact graph model can, in some embodiments, also provide an output along with a measure of confidence (e.g., the user is deemed 99% likely to be a good user, or only 12% likely to be a good user, etc.).

Of course, different learning models other than random forest can be used, and the techniques disclosed herein may be adapted as desired for artificial neural networks (ANNs), gradient boosting trees (GBTs), etc. Thus, in one embodiment, graph training data comprising labeled contact graphs can be input into a GBT model having particular internal parameters (which may be constructed/determined based on the training data). Output of the GBT model having the particular internal parameters can then be repeatedly compared to the known labels for the contact graphs. The GBT model can then be altered based on the comparing to refine accuracy of the GBT model. For example, a first decision tree can be calculated based on the known data, then a second decision tree can be calculated based on inaccuracies detected in the first decision tree. This process can be repeated, with different weighting potentially given to different trees, to produce an ensemble of trees with a refined level of accuracy significantly above what might be produced from only one or two particular trees.

Accordingly, in other embodiments, an artificial neural network (ANN) model is trained to produce a contact graph model 412c. Internal parameters of the ANN model (e.g., corresponding to mathematical functions operative on individual neurons of the ANN) are then varied. Output from the ANN model is then compared to known results, during the training process, to determine one or more best performing sets of internal parameters for the ANN model. Thus, many different internal parameter settings may be used for various neurons at different layers to see which settings most accurately predict whether a particular contact graph is likely to have engaged in a particular behavior, such as fraud, collusion, compliance, preferences, and/or any other behavior that may be of interest.

The method 1000 may then proceed to block 1006 where a trained contact graph model is produced based on the training that may identify whether a user associated with a contact graph will be a risk, satisfy compliance parameters, can be identified, will have a particular user preference, etc. In an embodiment, at block 1006, the contact graph model engine 408 produces the contact graph model stored in the contact graphs models 412c in the contact graph database 412. The contact graph model may be associated with a condition for which it was created and by which it was trained (e.g., a particular service, a particular parameter for which it is being created (e.g., risk, compliance, identification, preferences, etc.), and/or other conditions that would be apparent to one of skill in the art in possession of the present disclosure). The contact graph model may be stored in the contact graph models 412c in the contact graph database 412 for future use by the scoring engine 406.

Figure 11:
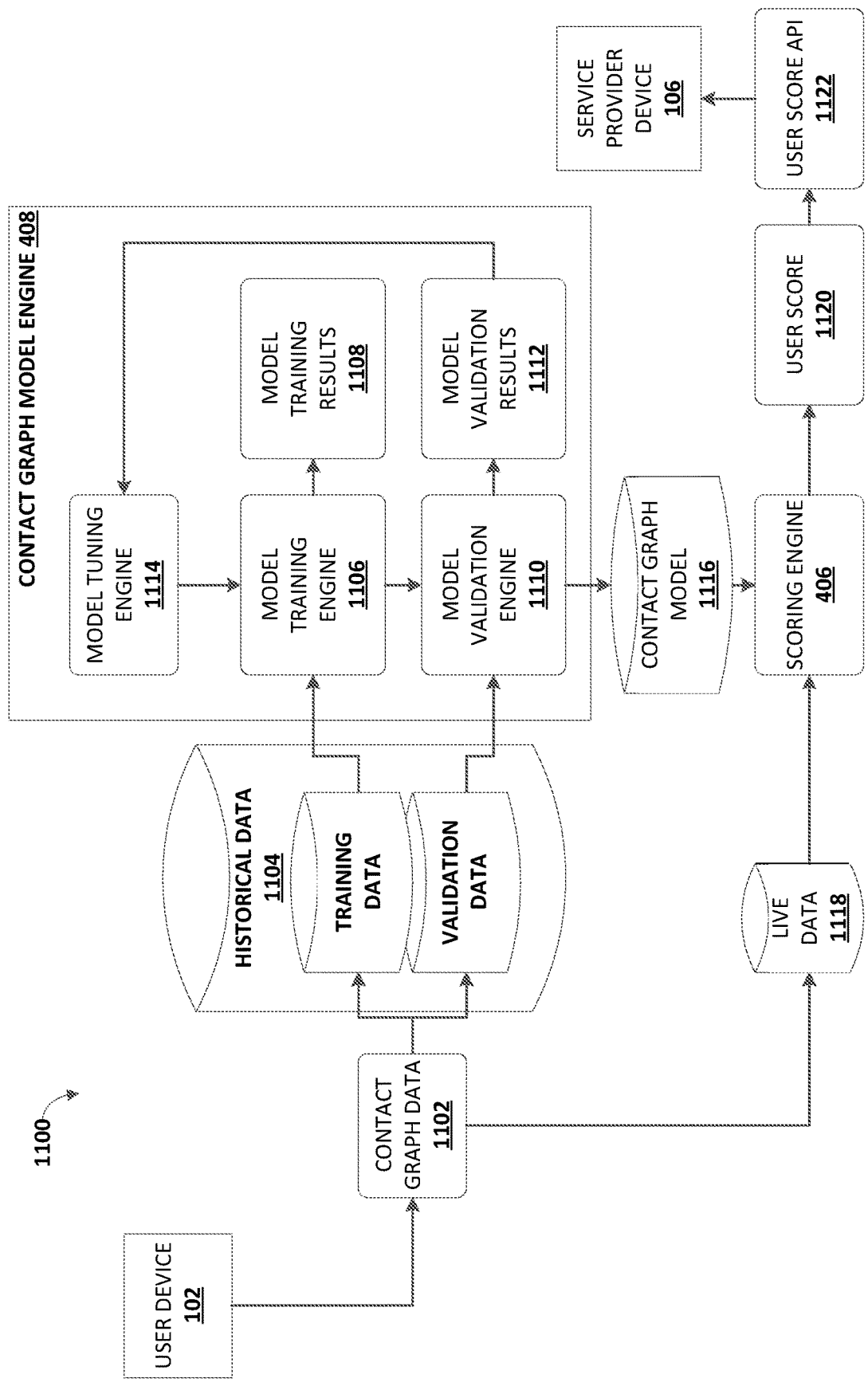
FIG. 11 is a block diagram illustrating a flow of training a contact graph model and using a contact graph model in the contact graph scoring system of FIG. 1 and during the methods of FIGS. 5 and 10.

Referring now to FIG. 11, an example contact graph scoring flow 1100 is illustrated that includes the contact graph model generation of method 1000 of FIG. 10. As illustrated, the contact graph device 108/400 may obtain contact graph data 1102 from the user device 102/200 that may include a contact list, user information, user device information (e.g., a phone number or other user device identifier), contact information about the contact entries in the contact list, and/or any other information that would be apparent to one of skill in the art in possession of the present disclosure. The contact graph data 1102 may be formatted by the contact graph generator 405 as a contact graph. The contact graph data 1102 may be added to historical data 1104 that may include training data and validation data. As discussed above, the historical data may include contact graphs and contact graph data of various users associated with the service provided by the service provider device 106/300. The service provider device 106/300 may provide data associated with the service provider to the historical data.

As discussed above with respect to method 1000 of FIG. 10, the training data may be used by model training engine 1106 included in the contact graph model engine 408. Using a machine learning algorithm, the model training engine 1106 may generate contact graph model for a service and obtain model training results 1108 and also provide the contact graph model to a model validation engine 1110 to validate that the model is accurate. For example, the validation data may be provided to the model validation engine 1110 to obtain model validation results 1112. In some embodiments, the contact graph model may be validated if the model validation results satisfy a predetermined condition. For example, the model may have to correctly predict an outcome for a predetermined percentage of validation data (e.g., satisfy at least 97%, 95% accuracy, 90% accuracy, 80% accuracy, and/or any predetermined percentage threshold determined as acceptable). The model validation results 1112 may be provided to a model tuning engine 1114 to perform optimization on the model. For example, the model tuning engine 1114 may include hyperparameter tuning functionality that finds parameters to define the model architecture (e.g., how many trees should be included in the random forest or how many neurons and/or layers should be included in the neural network). The contact graph model may be updated with the hyperparameters determined by the model tuning engine 1114 so that the contact graph model can be retrained by the model training engine 1106. When the contact graph model is optimized, trained, and validated, the contact graph model 1116 may be stored in the contact graph database 412 with other contact graph models 412c and used by the scoring engine 406.

During the user scoring method 500 of FIG. 5, the contact graph data 1102 from the user device (e.g., live data 1118) may be provided to the scoring engine 406. The scoring engine 406, using that live data 1118 and the contact graph model 1116, may generate a user score 1120. The scoring engine 406 may provide the user score 1120 to a user score API 1122 where one more client computing devices (e.g., the service provider device 106/300) may obtain the user score and use the user score to perform a service action (e.g., a risk assessment, an identity validation, a compliance decision, a user personalization decision, and/or other uses that would be apparent to one of skill in the art in possession of the present disclosure).

Figure 12:
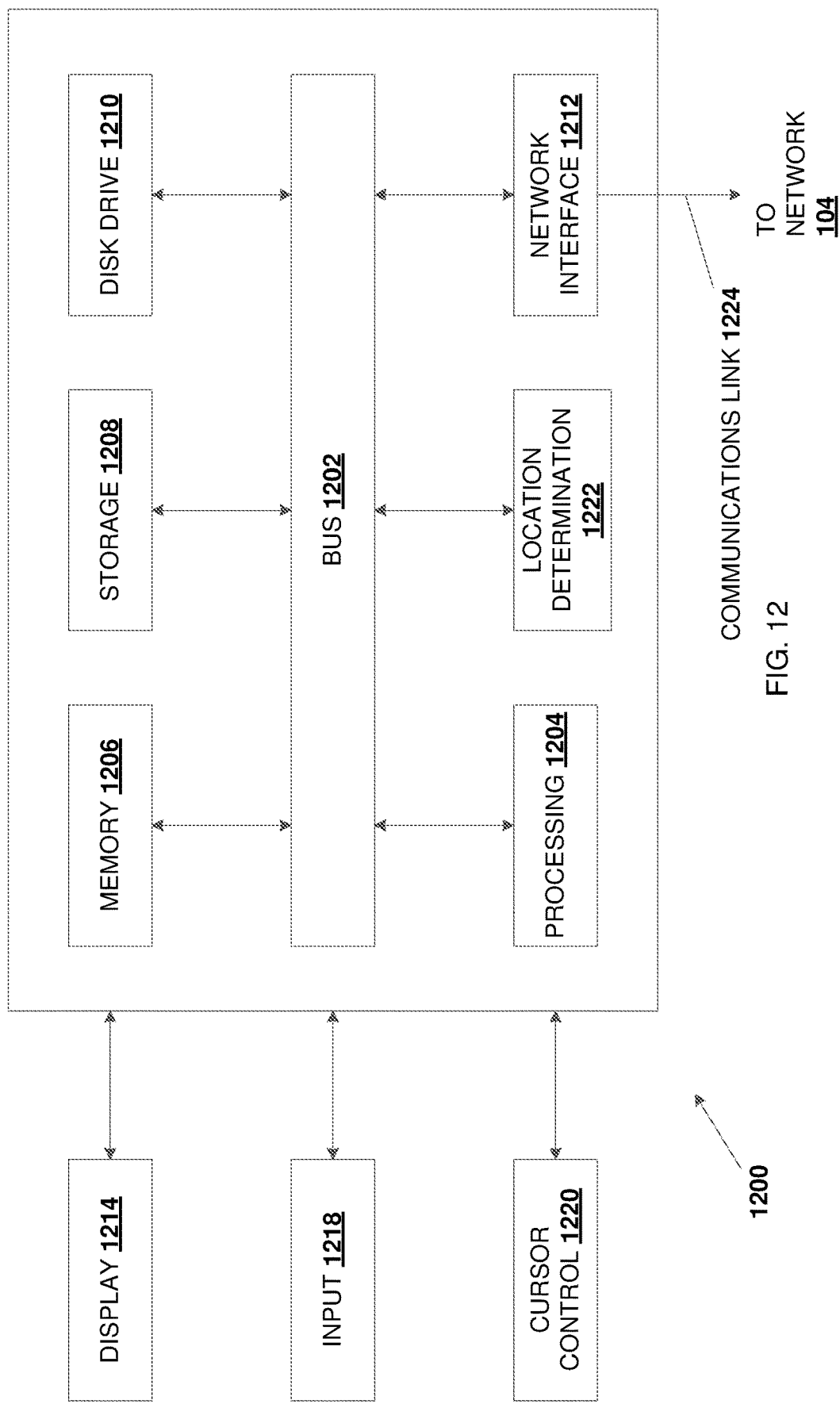
FIG. 12 is a block diagram of an example computer system according to various aspects of the present disclosure.

FIG. 12 is a block diagram of a computer system 1200 suitable for implementing one or more embodiments of the present disclosure, including the user device 102/300, the service provider device 106/300, and the contact graph device 108/400. In various implementations, the user device 102/200 may include a mobile cellular phone, personal computer (PC), laptop, wearable computing device, etc. adapted for wireless communication, and each of the service provider device 106/300 and the contact graph device 108/400 may include a network computing device, such as a server. Thus, it should be appreciated that the devices 102/200, 106/300, and 108/400 may be implemented as the computer system 1200 in a manner as follows.

In accordance with various embodiments of the present disclosure, computer system 1200, such as a computer and/or a network server, includes a bus 1202 or other communication mechanism for communicating information, which interconnects subsystems and components, such as a processor 1204 (e.g., processor, micro-controller, digital signal processor (DSP), etc.), a system memory component 1206 (e.g., RAM), a static storage component 1208 (e.g., ROM), a disk drive component 1210 (e.g., magnetic or optical), a network interface component 1212 (e.g., modem or Ethernet card), a display component 1214 (e.g., CRT or LCD), an input component 1218 (e.g., keyboard, keypad, or virtual keyboard), a cursor control component 1220 (e.g., mouse, pointer, or trackball), and/or a location determination component 1222 (e.g., a Global Positioning System (GPS) device as illustrated, a cell tower triangulation device, and/or a variety of other location determination devices known in the art.) In one implementation, the disk drive component 1210 may comprise a database having one or more disk drive components.

In accordance with embodiments of the present disclosure, the computer system 1200 performs specific operations by the processor 1204 executing one or more sequences of instructions contained in the memory component 1206, such as described herein with respect to the computing devices and anomaly detection server, and/or any other device. Such instructions may be read into the system memory component 1206 from another computer readable medium, such as the static storage component 1208 or the disk drive component 1210. In other embodiments, hard-wired circuitry may be used in place of or in combination with software instructions to implement the present disclosure.

Logic may be encoded in a computer readable medium, which may refer to any medium that participates in providing instructions to the processor 1204 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 1210, volatile media includes dynamic memory, such as the system memory component 1206, and transmission media includes coaxial cables, copper wire, and fiber optics, including wires that comprise the bus 1202. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 1200. In various other embodiments of the present disclosure, a plurality of the computer systems 1200 coupled by a communication link 1224 to the network 104 (e.g., such as a LAN, WLAN, PTSN, and/or various other wired or wireless networks, including telecommunications, mobile, and cellular phone networks) may perform instruction sequences to practice the present disclosure in coordination with one another.

The computer system 1200 may transmit and receive messages, data, information and instructions, including one or more programs (i.e., application code) through the communication link 1224 and the network interface component 1212. The network interface component 1212 may include an antenna, either separate or integrated, to enable transmission and reception via the communication link 1224. Received program code may be executed by processor 1204 as received and/or stored in disk drive component 1210 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a computing device, a server device, other devices described herein.

What is claimed is:

1. A system, comprising:
 a non-transitory memory; and
 one or more hardware processors that are coupled to the non-transitory memory and configured to execute instructions from the non-transitory memory to cause the system to perform operations comprising:
  receiving a contact list associated with a user and a user device identifier associated with a user device of the user, wherein the contact list includes a first set of user device identifiers, and wherein each user device identifier of the first set is associated with a respective user and a respective user device;
  associating the user device identifier with the first set of the user device identifiers of the contact list;
  generating, based on the associating, a contact graph for the user, wherein the first set of the user device identifiers are associated as first-degree contacts in the contact graph;
  determining, based on the first set of user device identifiers, that at least a portion of the first set of the user device identifiers are stored in a contact database accessible to the one or more hardware processors;
  generating a user score based on user information associated with the at least the portion of the first set of the user device identifiers in the contact database, the contact graph, and a contact graph model; and
  providing the user score to a transaction assessment service as an input for the transaction assessment service deciding whether a particular electronic transaction is approved for processing by an electronic service provider.

2. The system of claim 1, wherein the operations further comprise:
 identifying, based on the at least the portion of the first set of the user device identifiers that are stored in the contact database, a second set of user device identifiers that are first-degree contacts of the portion of the first set of the user device identifiers;
 adding the second set of user device identifiers to the contact graph associated with the user device identifier associated with the user and the user device as second-degree contacts; and
 determining, based on the user device identifiers of the second set of user device identifiers, that at least a portion of the second set of the user device identifiers are stored in the contact database and associated with user information for a respective user and a respective user device, wherein the generating the user score is based on the user information associated with the at least the portion of the second set of the user device identifiers in the contact database.

3. The system of claim 2, wherein the user information associated with the first-degree contacts in the contact graph provide more weight by the contact graph model to the user score than the second-degree contacts in the contact graph.

4. The system of claim 1, wherein the receiving the contact list and the user device identifier for the user device is in response to providing a contact list request to the user device via a service provider application installed on the user device that is associated with the transaction assessment service provided by the electronic service provider.

5. The system of claim 4, wherein the operations further comprise:
 receiving, from the electronic service provider, a request for the user score associated with the user and the user device, wherein the providing the contact list request is in response to the receiving the request for the user score.

6. The system of claim 1, wherein the receiving is via the electronic service provider.

7. The system of claim 1, wherein the contact graph model used to generate the user score is selected from a plurality of contact graph models based on the transaction assessment service.

8. The system of claim 1, wherein the operations further comprise:
 receiving updates to the contact list;
 updating the contact graph based on the updates to the contact list;

generating, based on the updated contact graph, an updated user score; and providing the updated user score to the transaction assessment service provided by the electronic service provider.

9. The system of claim 1, wherein the operations further comprise:
receiving updates to the user information stored in the contact database;
generating, based on the updated user information, an updated user score; and
providing the updated user score to the transaction assessment service provided by the electronic service provider.

10. The system of claim 1, wherein the operations further comprise:
adding user information associated with the user, the user device identifier, and the contact list, as an entry in the contact database.

11. The system of claim 1, wherein the generating the contact graph includes linking the user device identifier with the user device identifiers in the contact list and linking any user device identifiers that are included in the contact database that are associated with the user device identifiers in the contact list to those user device identifiers of the contact list.

12. A method of training a contact graph model, comprising:
accessing, by a first computer system, a contact database that includes a plurality of user device identifiers, wherein each of the user device identifiers of the plurality of user device identifiers is associated with a user, user information associated with the user, a contact graph that identifies other user device identifiers of the plurality of user device identifiers that are first-degree contacts associated with the user device identifier, and a first risk score;
training, by the first computer system, a contact graph model using a machine learning algorithm and using a first set of the plurality of user device identifiers, wherein the training includes applying the machine-learning algorithm to each user device identifier of the first set of the plurality of user device identifiers, the user information associated with each user device identifier of the first set, the first risk score associated with each user device identifier, user information associated with the user device identifiers that are first-degree contacts associated with the user device identifier, and a second risk score associated with any of those user device identifiers that are first-degree contacts; and
based on the training, generating, by the first computer system, a trained contact graph model that identifies a third risk score for a subsequent user device identifier using a subsequent contact list associated with the subsequent user device identifier and the user device identifiers obtained from that subsequent contact list.

13. The method of claim 12, further comprising:
receiving, by the first computer system, a first contact list and a first user device identifier associated with the first contact list, wherein the first contact list includes a second set of user device identifiers;
generating, by the first computer system, a first contact graph for the first user device identifier by associating the first user device identifier with the second set of the user device identifiers, wherein the second set of the user device identifiers are associated in the first contact graph as first-degree contacts;
determining, by the first computer system and based on the user device identifiers of the second set of the user device identifiers, that at least a portion of the second set of the user device identifiers correspond with at least a portion the plurality of user device identifiers that are stored in the contact database; and
generating, by the first computer system and based on the first contact graph, the user information associated with the at least the portion of the plurality of user device identifiers in the first contact graph, the risk scores of the at least the portion of the plurality of user device identifiers stored in the contact database, and the trained contact graph model, the third risk score for the first user device identifier.

14. The method of claim 13, further comprising:
providing, by the first computer system, the risk score and the first user device identifier to a service provided by a service provider device.

15. The method of claim 13, wherein the trained contact graph model is trained based on a service being associated with the plurality of user device identifiers, and the trained contact graph model is selected to be used by the first computer system to generate the risk score for the first user device identifier in response to a user device associated with the first user device identifier attempting to access the service.

16. The method of claim 12, wherein the trained contact graph model is trained based on a service associated with the plurality of user device identifiers stored in the contact database.

17. The method of claim 12, wherein the training the contact graph model includes:
validating, by the first computer system, the contact graph model with validation data; and
updating, by the first computer system, the contact graph model until a training and validation condition is satisfied that is performed prior to the generating the trained contact graph model.

18. A method of contact graph scoring, comprising:
receiving, by a computer system, a first contact list and a first user device identifier associated with the first contact list, wherein the first contact list includes a first set of user device identifiers;
generating, by the computer system, a first contact graph for the first user device identifier by associating the first user device identifier with the first set of the user device identifiers of the contact list, wherein the first set of the user device identifiers are associated in the first contact graph as first-degree contacts of the first user device identifier;
determining, by the computer system and based on the user device identifiers of the first set of the user device identifiers, that at least a portion of the first set of the user device identifiers correspond with a second set of user device identifiers of a plurality of user device identifiers that are stored in a contact database;
generating, by the computer system based on the first contact graph, user information associated with the second set of user device identifiers, user information associated with the second set of user device identifiers in the contact database, and a trained contact graph model, a first user device identifier score for the first user device identifier, wherein the trained contact graph model is generated based on a contact graph model that is trained using a machine-learning algorithm and using a first training set of a plurality of training user device identifiers, wherein the training includes applying the machine-learning algorithm to each training user device identifier of the first training set, user information associated with each training user device identifier, a first risk score associated with each training user device identifier, user information associated with training user device identifiers that are first-degree contacts associated with the training user device identifier, and a second risk score associated with any of those training user device identifiers that are first degree contacts; and providing the first user device identifier score to a service identified as requesting the first user device identifier score.

19. The method of claim 18, further comprising:

identifying, based on the second set of the user device identifiers that are stored in the contact database and that are first-degree contacts in the first contact graph, a third set of user device identifiers that are first-degree contacts of the second set of the user device identifiers;

adding the third set of user device identifiers to the first contact graph as second-degree contacts of the first user device identifier; and determining, based on the user device identifiers of the third set of the plurality of user device identifiers, that a fourth set of user device identifiers are stored in the contact database, wherein the generating the first user device identifier score is based on the user information associated with the fourth set of user device identifiers.

20. The method of claim 19, wherein the first set of user device identifiers and the third set of user device identifiers are associated with users of the service that is requesting the first user device identifier score.

* * * * *